United States Patent Office 2,998,431
Patented Aug. 29, 1961

2,998,431
PURIFICATION OF BENZENE POLY-CARBOXYLIC ACIDS
Art C. McKinnis, Long Beach, Calif., assignor to Union Oil Company of California, Los Angeles, Calif., a corporation of California
No Drawing. Filed Dec. 14, 1959, Ser. No. 859,101
8 Claims. (Cl. 260—346.3)

This invention relates to a process for the purification of benzene polycarboxylic acids, and in particular concerns a process for decolorizing and removing nitrogen-containing impurities from certain benzene polycarboxylic acids formed by the nitric acid oxidation of polyalkyl benzenes.

The formation of benzene polycarboxylic acids, e.g., phthalic acids, trimellitic acid, etc., by the nitric acid oxidation of the corresponding polyalkyl benzenes, e.g., xylenes, pseudocumene, etc., is well known, and constitutes the basis of a commercial method for the manufacture of such acids. However, the reaction is by no means quantitaitve, and the crude oxidate contains a variety of contaminants. A certain degree of purification is effected by suitably cooling the crude oxidate and separating off the polycarboxylic acid which thereby crystallizes, but such crystallization will not serve to remove certain impurities (apparently nitro-carboxylic acids) which impart a yellow color to the crystalline product and which can not be removed either by distillation or recrystallization. The presence of these colored impurities renders the acid product unsatisfactory for many of its uses, particularly in the manufacture of synthetic resins.

It is accordingly an object of the present invention to provide an improved method for purifying benzene polycarboxylic acids which have been prepared by the nitric acid oxidation of the corresponding polyalkylbenzene.

Another object is to provide an effective means for removing colored nitrogen-containing impurities from benzene polycarboxylic acids containing the same.

Other and related objects will be apparent from the following detailed description of the invention, and various advantages not specifically referred to herein will be apparent to those skilled in the art upon employment of the invention in practice.

I have now found that the foregoing objects and attendant advantages may be realized in a process which comprises heating the impure colored acid product in the presence of certain metals or their oxides, and thereafter subjecting the so-treated product to distillation under reduced pressure. More particularly, I have found that certain benzene polycarboxylic acids which have been formed by the nitric acid oxidation of the corresponding polyalkylbenzene and which are contaminated with colored (yellow) nitrogen-containing impurities can be purified to a very significant extent by heating the same to a moderately elevated temperature for a short period of time in the presence of a small amount of a metal of group V—B of the periodic table of the elements, or an oxide of such a metal, and thereafter distilling the so-treated product under reduced pressure. The distillate consists of the acid anhydride in essentially pure form, and may be converted to the free acid simply by adding water. Usually, however, it is marketed as such, leaving it up to the consumer to convert it to the free acid if necessary. The nitrogen content is less than 0.02 percent, and the color is very much lighter than that of the crude acid. When an especially purified product is desired, the product so obtained can be further purified by heating it in the absence of a catalytic agent at an elevated temperature for a short period of time and thereafter distilling under reduced pressure. The nitrogen content of the products so obtained is less than about 0.003 percent. The melted product is almost water-white and the powdered solid product is snow-white.

Considering now the process of the invention in greater detail, it is applicable to the purification and color improvement of any benzene polycarboxylic acid containing from 2 to 4 carboxyl groups, which has been formed by nitric acid oxidation of the corresponding di-, tri- or tetra-alkylbenzene and which is capable of forming the corresponding acid anhydride. It is also applicable to the treatment of the acid anhydrides themselves. Thus, it is applicable to the treatment of any or a mixture of orthophthalic acid, trimellitic acid, hemimellitic acid, pyromellitic acid, prehnitic acid, mellophanic acid, and the anhydrides of such acids. However, it is not applicable to the treatment of iso- and terephthalic acids since these acids can not form anhydrides because their carboxyl groups do not occupy adjacent positions on the benzene nucleus. The formation of acids and acid anhydrides by the nitric acid oxidation of such polyalkylbenzenes as the xylenes, ethyl toluene, pseudocumene, mesitylene, prehnitene, durene, isodurene, etc., is well known and in itself forms no part of the present invention. However, the present process is most effective when the impure acid product is free from unoxidized or incompletely oxidized alkylbenzenes, and in the event such materials are present it is preferred to pretreat the acid by heating it with excess nitric acid at a temperature between about 160° C and 250° C. for one to thirty minutes. It is also preferred that the acid product which is treated in accordance with the invention be free from iron or other metal which promotes decarboxylation. This can be insured by carrying out its preparation in corrosion resistant equipment. Usually the acid product is one which has already been partially purified, e.g., by crystallization from the crude oxidate as referred to above.

As stated, the initial step of the present process consists in heating the impure colored acid in the presence of a small amount of a metal of group V—B of the periodic table or the oxide of such a metal, i.e., vanadium, niobium and tantalum and the oxides thereof. Vanadium pentoxide is preferred. The amount in which the metal or metal oxide is effective is dependent upon the identity of the acid and the amount and nature of the contaminants therein, as well as upon the temperature to which the acid is heated. In general, however, such amount is between about 0.005 and about 0.5 percent by weight of the acid, and in most instances between about 0.01 and about 0.1 percent will be sufficient. The heat treatment is carried out at a temperature between about 300° C. and about 400° C., preferably between about 300° C. and about 360° C., and over a period of time which varies inversely with the temperature between about two and about sixty minutes. Usually the treatment is effected at atmospheric pressure, although super- or sub-atmospheric pressures may be employed, if desired. As will be apparent, the conditions of time, temperature and amount of vanadium pentoxide employed will be correlated so as to produce an ultimate product of satisfactory purity and color.

Upon completion of the heat treatment, the treated product is distilled under reduced pressure at a temperature between about 200° C. and about 320° C., to obtain the substantially pure acid anhydride as the overhead fraction. To obtain the maximum yield of product, the bottoms fraction can be recycled to the reaction wherein the acid is initially prepared by oxidation of the corresponding polyalkylbenzene. Advantageously, the recycle stream need not be treated for removal of the metal or metal oxide prior to its introduction into the oxidation zone for I have found that the presence of the catalyst in the trace amounts employed has no adverse effect on the oxidation reaction.

The subsequent thermal purification which is optional in my invention depending on the purity desired in the acid product consists in heating the purified and distilled product at a temperature between about 300° C. and 400° C., and preferably between about 340° C. and 360° C., for a period of time which varies inversely with temperature between about two and sixty minutes. This thermal treatment is conducted in corrosion-proof equipment and in the absence of an added metal or metal oxide. The time and temperature of the heating are chosen so as to obtain an essentially water-white acid with less than about 0.005 percent nitrogen. Upon completion of the thermal treatment, the treated product is distilled under reduced pressure a a temperature between about 200° C. and about 320° C. to obtain the acid anhydride as the overhead fraction.

The following examples will serve to illustrate the invention, but are not to be construed as limiting the same. All proportions are expressed in parts by weight.

*Example I*

One hundred parts of a discolored crude trimellitic acid which had been prepared by the nitric acid oxidation of pseudocumene and which contained about 2.4 percent by weight of nitration products were mixed with 0.4 part by weight of vanadium pentoxide, and then heated at 330° C., for sixty minutes. The product so obtained was cooled and then distilled at 7 mm. Hg pressure and 265° C. to obtain a purified trimellitic anhydride product. Said product was substantially white in color (faint yellow tinge when melted) and contained 0.06 percent by weight of nitration products. The total nitrogen content was 0.013 percent.

When tantalum oxide or niobium are employed in place of the vanadium pentoxide, substantially the same results can be obtained; however when elemental iron, cobalt, manganese or chromium or oxides and salts thereof are employed, equivalent results can not be obtained.

*Example II*

Ninety parts of the catalytically purified acid obtained in Example I were heated at 360° C. for five minutes. Thereafter the acid was cooled and distilled at 265° C. under 7 mm. Hg pressure to obtain a purified product. No trace of nitration impurities were found in the acid, and the total nitrogen content was only 0.001 percent. The melted acid was water-white.

I claim:

1. The method for treating a benzene polycarboxylic acid containing from 2 to 4 carboxyl groups, at least two of which occupy adjacent positions in the benzene nucleus, said acid having been prepared by the nitric acid oxidation of the corresponding polyalkyl benzene and containing colored and nitrogen-containing impurities, which comprises heating said acid at a temperature between about 300° C. and about 400° C., in the presence of a material selected from the class consisting of the metals of group V—B of the periodic table, and the oxides of said metals, and thereafter subjecting the product so obtained to distillation under reduced pressure to obtain a distillate product comprising the anhydride of said acid.

2. A method as defined by claim 1 wherein said acid is trimellitic acid.

3. A method as defined by claim 1 wherein said material is vanadium pentoxide.

4. A method as defined by claim 1 wherein said material is provided in an amount representing between about 0.005 and about 0.5 percent by weight of said acid.

5. A method as defined by claim 1 in combination with the steps of heating said distillate at a temperature between about 300° C. and 400° C. in the absence of said material, and thereafter distilling the product so obtained under reduced pressure.

6. A method as defined by claim 5 wherein the said acid is trimellitic acid and the said material is vanadium pentoxide.

7. A method as defined by claim 1 wherein the said acid contains incompletely oxidized polyalkyl benzene, and is heated with excess nitric acid at a temperature between about 160° C. and about 220° C. prior to said heating in the presence of said material.

8. The method of treating trimellitic acid which has been prepared by the nitric acid oxidation of pseudocumene and which contains colored and nitrogen-containing impurities, which comprises heating said acid at a temperature between about 300° C. and about 400° C. for a period of time between about two and about sixty minutes in the presence of between about 0.005 and about 0.5 percent by weight of vanadium pentoxide, and thereafter subjecting the product so treated to distillation at a temperature between about 200° C. and about 320° C. under reduced pressure to obtain a distillate comprising trimellitic anhydride of substantially lighter color and substantially reduced nitrogen content.

References Cited in the file of this patent

UNITED STATES PATENTS 2,349,518    Porter _____ May 23, 1944